United States Patent Office 3,250,699
Patented May 10, 1966

3,250,699
TREATMENT OF AROMATIC EXTRACTS
Jacques Demeester, Paris, France, assignor to The British Petroleum Company Limited, London, England, a British joint-stock corporation
No Drawing. Filed Nov. 5, 1963, Ser. No. 321,403
Claims priority, application France, Nov. 9, 1962, 914,987
7 Claims. (Cl. 208—264)

This invention relates to the treatment of aromatic extracts for improving their colour and colour stability.

By aromatic extracts, we mean materials containing a high proportion of aromatic hydrocarbons and obtained by treating a hydrocarbon mixture with a selective solvent for aromatics.

In the production of lubricating oils, for example, it is necessary to remove most of the aromatic hydrocarbons from the lubricating oil feedstock; this is normally accomplished by treating the feedstock with a selective solvent for aromatics, and extracts rich in aromatic hydrocarbon are thus produced. These extracts, although not in general useful as lubricating oils, have other important uses where highly aromatic materials are required, but for such uses it is necessary to improve their colour and colour stability.

According to the present invention, the colour of an aromatic extract is improved by contacting the extract at elevated temperature and pressure and in the presence of hydrogen with a catalyst consisting essentially of oxides of cobalt, molybdenum and iron. The oxides are preferably incorporated with a support which is generally a refractory metal oxide. Activated alumina has been found to be a suitable support.

The amount of iron oxide in the catalyst (calculated as $Fe_2O_3$) may be from 4 to 20% by weight of total catalyst, and the amount of molybdenum oxide (calculated as $MoO_3$) may also be from 4 to 20% wt. The cobalt oxide may be present in an amount from 1 to 12% wt. (calculated as CoO). It is desirable to have a high content of iron oxide, particularly an amount in excess of the molybdenum oxide, a particularly preferred range is 6–15% wt. The molybdenum oxide content is preferably from 5–12% wt., and a preferred range for the cobalt oxide is from 0.5 to 4% wt. The ratio by weight of molybdenum oxide to cobalt oxide should be at least 1.5:1 and is preferably at least 3:1.

The catalyst is preferably prepared by impregnating alumina with solutions of the metal compounds followed by drying and calcination. In order to produce catalysts containing a high iron content, it is desirable to impregnate first with a solution of an iron compound followed by drying and calcination. Impregnation with a solution of a molybdenum compound then follows. It is desirable to carry out the impregnation with cobalt last, with preferably another calcination between this impregnation and the previous impregnation with molybdenum. Further information on suitable catalysts and their methods of preparation is contained in French Patent Nos. 1,195,544, 1,244,312 and 1,270,706.

Temperatures in the range 250° C.–320° C. have been found to be satisfactory, temperatures within the range 275° C.–300° C. being preferred. The pressure may vary between 5 atmospheres and 80 atmospheres but in practice it is convenient to use a pressure corresponding to the pressure of the hydrogen-rich gas from catalytic reforming processes which may be between 20–30 atmospheres. The hydrogen feed rate may vary between 5–150 vols. per volume of oil under normal conditions. The feed rate may vary from 0.5–6 vols. of oil per volume of catalyst per hour.

The invention will now be illustrated with reference to the following examples:

Example 1

The feedstock was an extract from a Kuwait crude oil and had the following properties:

| | |
|---|---:|
| Density at 15° C. | 0.963 |
| Flashpoint ° C. | 278 |
| Pour point ° C. | +30 |
| Acidity mg./KOH/g. | 0.045 |
| Colour ASTM D. 1500 | 6.5 |
| Colour ASTM D. 1500 after ageing 16 hrs. at 185° F. | >8 |
| Total sulphur percent wt. | 4.10 |
| Ramsbottom carbon percent wt. | 1.81 |
| Engler viscosity at 50° C. | 132 |
| Viscosity cst. at— | |
| 122° F. | 998 |
| 210° F. | 52.3 |

The extract was contacted with a catalyst having the following composition by weight:

| | |
|---|---:|
| Molybdenum oxide, $MoO_3$ | 10.4 |
| Cobalt oxide, CoO | 3.0 |
| Iron oxide, $Fe_2O_3$ | 11.6 |
| Alumina | Balance | at a temperature of 285° C., a pressure of 25 kg./cm.$^2$, with a flow rate of the oil of 1 v./v./h. and a hydrogen flow rate of 20 v./v./h.

The treated oil had the following properties:

| | |
|---|---:|
| Density at 15° C. | 0.962 |
| Flashpoint ° C. | 281 |
| Pour point ° C. | +27 |
| Acidity mg./KOH/g. | 0.016 |
| Colour ASTM D. 1500 | >4.3 |
| Colour ASTM D. 1500 after ageing 16 hrs. at 185° F. | 6 |
| Total sulphur percent wt. | 3.84 |
| Ramsbottom carbon percent wt. | 1.73 |
| Engler viscosity at 50° C. | 125 |
| Viscosity cst. at— | |
| 122° F. | 944 |
| 210° F. | 50.7 |

Example 2

The feedstock was an extract obtained from a Saharan crude oil and had the following properties:

| | |
|---|---:|
| Density at 15° C. | 0.966 |
| Flashpoint ° C. | 203 |
| Pour point ° C. | +9 |
| Acidity mg./KOH/g. | 0.176 |
| Colour D. 1500 | >8 |
| Total sulphur percent wt. | 0.31 |
| Ramsbottom carbon percent wt. | 0.19 |
| Engler viscosity at 50° C. | 3.98 |
| Viscosity cst. at— | |
| 100° F. | 57.5 |
| 122° F. | 29.2 |
| 210° F. | 5.41 |

The feedstock was contacted with a catalyst having the following composition:

| | |
|---|---:|
| Molybdenum oxide $MoO_3$ | 10.4 |
| Cobalt oxide CoO | 3.0 |
| Iron oxide $Fe_2O_3$ | 11.6 |
| Alumnia | Balance | at a temperature of 285° C., a pressure of 25 kg./cm.$^2$, a hydrogen flow rate of 20 v./v./h. and space velocities of the feedstock of 0.5 and 1.0.

The treated oil had the following properties:

| | | |
|---|---|---|
| Space velocity | 0.5 | 1.0 |
| Density at 15° C | | 0.961 |
| Flashpoint, ° C | | 211 |
| Pour Point, ° C | | +9 |
| Acidity mg./KOH/g | 0.005 | 0.005 |
| Total Sulphur, percent wt | | 0.31 |
| Ramsbottom Carbon, percent wt | | 0.18 |
| Engler Viscosity at 50° C | | 3.90 |
| Viscosity, Cst. at 100° F | | 56.2 |
| Viscosity, Cst. at 122° F | | 28.6 |
| Viscosity, Cst. at 210° F | | 5.36 |
| Colour, ASTM D. 1500 | <1.4 | <1.4 |
| Colour, ASTM D. 1500 after ageing 16 hrs. at 185° F | 1.85 | 2.1 |

In each of the above examples an improvement in colour is obtained and also an improvement in colour stability and acidity.

I claim:

1. A process for improving the color of aromatic extracts comprising contacting the extract at a temperature within the range of 250° C. to 320° C. at a pressure of at least 5 atmospheres and in the presence of hydrogen with a catalyst consisting essentially of from 4% to 20% by weight of iron oxide, from 4% to 20% by weight of molybdenum oxide and from 1% to 12% by weight of cobalt oxide, the iron oxide content exceeding the molybdenum oxide content and the catalyst being present on a refractory metal oxide support.

2. A process as in claim 1 wherein the catalyst consists essentially of from 6% to 15% by weight of iron oxide, from 5% to 12% by weight of molybdenum oxide, and from 0.5% to 4% by weight of cobalt oxide and is supported on an alumina catalyst support.

3. A process as in claim 1 wherein the temperature of treatment is within the range of 275° C. to 300° C.

4. A process as claimed in claim 1 wherein the pressure is within the range 5–80 atmospheres and preferably within the range 20–30 atmospheres.

5. A process as claimed in claim 1 wherein the hydrogen feed rate is within the range 5–150 volumes per volume of oil.

6. A process as claimed in claim 1 wherein the feedstock space velocity is within the range 0.5–6 v./v./hr.

7. A process as claimed in claim 1 wherein the aromatic extract is derived from a lubricating oil feedstock.

References Cited by the Examiner

UNITED STATES PATENTS

| | | | |
|---|---|---|---|
| 2,880,171 | 3/1959 | Flinn et al. | 208—217 |
| 2,911,354 | 11/1959 | Holder et al. | 208—211 |
| 3,011,972 | 12/1961 | Watson et al. | 208—211 |
| 3,020,228 | 2/1962 | Demeester | 208—264 |

DELBERT E. GANTZ, *Primary Examiner.*

S. P. JONES, *Assistant Examiner.*